United States Patent
Nakazawa (12)

(10) Patent No.: US 8,908,007 B2
(45) Date of Patent: Dec. 9, 2014

(54) TRANSMISSION DEVICE AND TRANSMISSION METHOD

(75) Inventor: Taiho Nakazawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/125,851

(22) PCT Filed: Jul. 12, 2012

(86) PCT No.: PCT/JP2012/004501
§ 371 (c)(1),
(2), (4) Date: Dec. 12, 2013

(87) PCT Pub. No.: WO2013/011671
PCT Pub. Date: Jan. 24, 2013

(65) Prior Publication Data
US 2014/0118478 A1 May 1, 2014

(30) Foreign Application Priority Data

Jul. 15, 2011 (JP) ................. 2011-156402

(51) Int. Cl.
*H04N 7/14* (2006.01)
*H04N 19/164* (2014.01)
*H04N 19/137* (2014.01)
*H04N 19/115* (2014.01)

(52) U.S. Cl.
CPC .......... *H04N 7/11* (2013.01); *H04N 19/00236* (2013.01); *H04N 19/00145* (2013.01); *H04N 19/0006* (2013.01)
USPC ..................... 348/14.13; 342/22; 348/333.05; 382/104; 382/106; 382/162; 382/218; 382/275; 430/435; 430/506; 715/771; 725/93; 725/143

(58) Field of Classification Search
CPC ............ H04N 7/141; H04N 19/00236; H04N 19/00145; H04N 19/0006

USPC ............. 342/22; 348/14.13, 333.05; 382/104, 382/106, 162, 218, 275; 430/435, 506; 715/771; 725/93, 143
See application file for complete search history.

(56) References Cited

U.S. PATENT DOCUMENTS 6,589,721 B1 * 7/2003 Arcus et al. .................. 430/435
6,696,232 B2 * 2/2004 Sowinski ...................... 430/506
(Continued)

FOREIGN PATENT DOCUMENTS

JP          10-42185 A       2/1998
JP       2001-069472 A       3/2001
(Continued)

OTHER PUBLICATIONS

International Search Report issued in International Application No. PCT/JP2012/004501 with Date of mailing Oct. 23, 2012, with English Translation.

*Primary Examiner* — Gerald Gauthier
(74) *Attorney, Agent, or Firm* — McDermott Will & Emery LLP

(57) ABSTRACT

A transmission device includes an image capturing part that captures a subject and generates a plurality of temporally successive frame images, an analyzer that analyzes a size of a motion of the subject by use of at least two or more of the frame images, a viewing condition receiver that receives viewing conditions from a reception device, and a network bandwidth measurement part that measures a congestion degree of a network. The transmission device further includes a controller that controls a data volume of the plurality of frame images based on the size of the motion of the subject, the viewing conditions, and the congestion degree of the network, to determine a predetermined parameter for encoding, an encoder that encodes the plurality of frame images based on the predetermined parameter, and a transmitter that transmits the plurality of encoded frame images.

9 Claims, 12 Drawing Sheets

(56) References Cited

U.S. PATENT DOCUMENTS

| | | | |
|---|---|---|---|
| 7,218,776 B2* | 5/2007 | Sowinski et al. | 382/162 |
| 7,346,226 B2* | 3/2008 | Shyshkin | 382/275 |
| 7,818,779 B2* | 10/2010 | Matsuzaki et al. | 725/143 |
| 7,978,248 B2* | 7/2011 | Terashima | 348/333.05 |
| 8,281,350 B2* | 10/2012 | Ozawa | 725/93 |
| 8,306,272 B2* | 11/2012 | Reinpoldt, III | 382/106 |
| 8,839,132 B2* | 9/2014 | Reichert | 715/771 |
| 2005/0169500 A1* | 8/2005 | Takahashi et al. | 382/104 |
| 2008/0240578 A1* | 10/2008 | Gudmundson et al. | 382/218 |
| 2010/0214150 A1* | 8/2010 | Lovberg et al. | 342/22 |
| 2014/0118478 A1* | 5/2014 | Nakazawa | 348/14.13 |

FOREIGN PATENT DOCUMENTS

| | | |
|---|---|---|
| JP | 2004-193990 A | 7/2004 |
| JP | 2006-128997 A | 5/2006 |
| JP | 2007-324685 A | 12/2007 |
| JP | 2009-111441 A | 5/2009 |

* cited by examiner

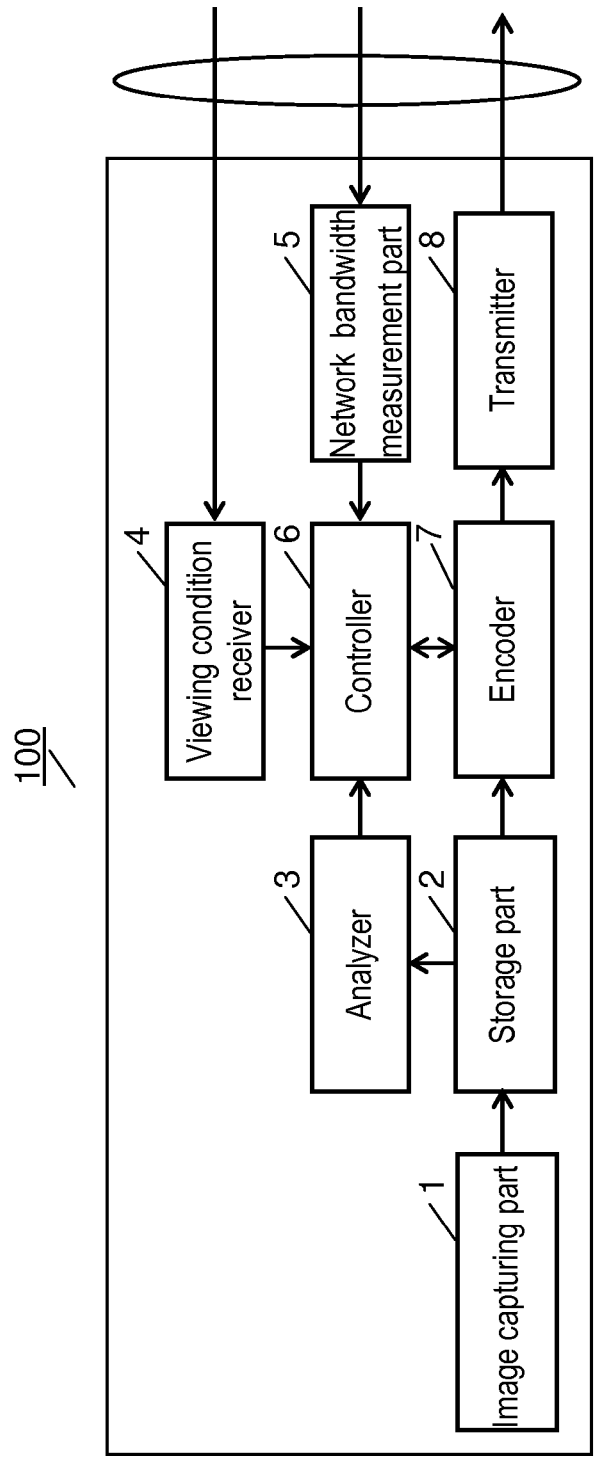

FIG. 2A

| Substantial bandwidth of network / Resolution of frame image | ~24kbps | 24k~1Mbps | 1~5Mbps | 5~10Mbps | 10Mbps~ |
|---|---|---|---|---|---|
| 1920×1080 | 3fps | 7fps | 15fps | 24fps | 30fps |
| 1280×720 | 7fps | 15fps | 24fps | 30fps | 30fps |
| 720×480 | 15fps | 24fps | 30fps | 30fps | 30fps |
| 320×240 | 24fps | 30fps | 30fps | 30fps | 30fps |
| 160×120 | 30fps | 30fps | 30fps | 30fps | 30fps |

FIG. 2B

| Size of motion | Frame rate |
|---|---|
| 1 | 3fps |
| 2 | 7fps |
| 3 | 15fps |
| 4 | 24fps |
| 5 | 30fps |

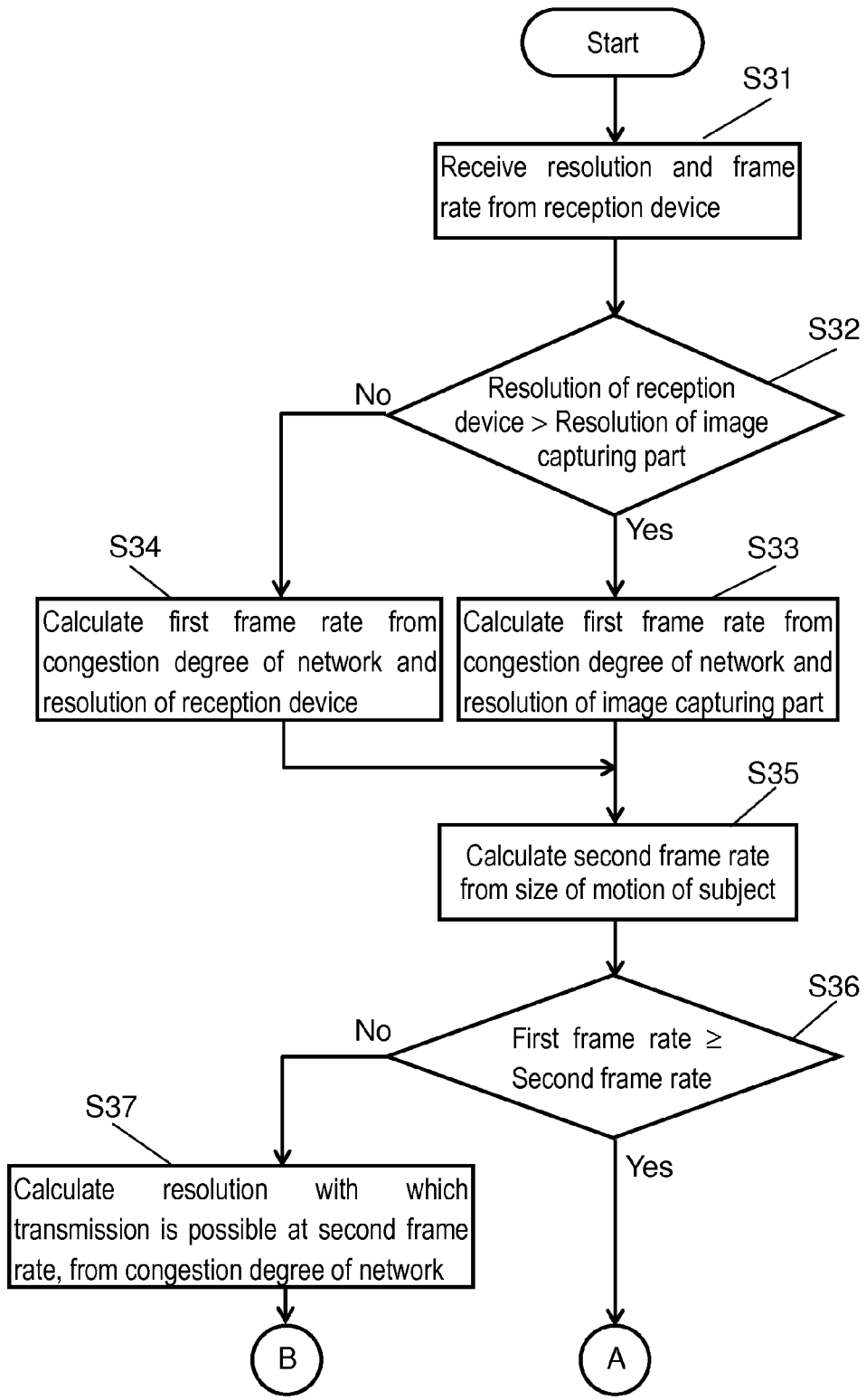

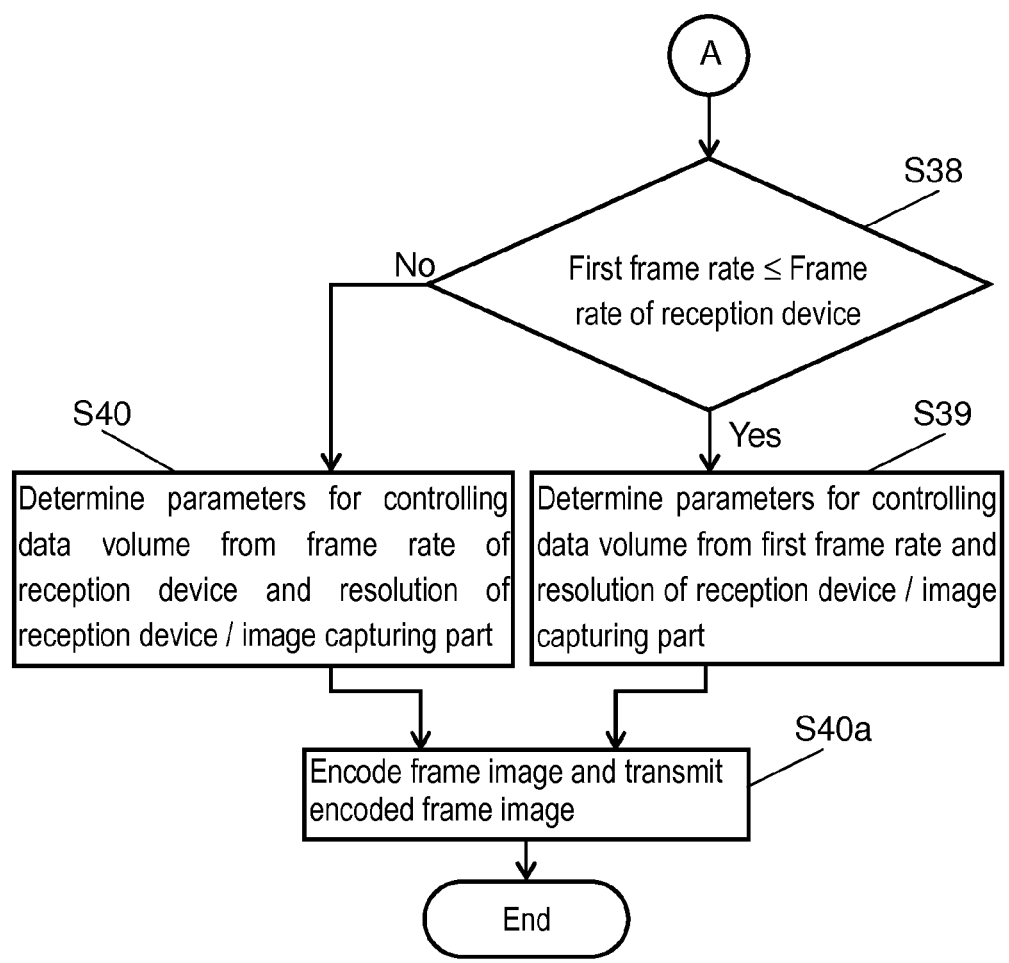

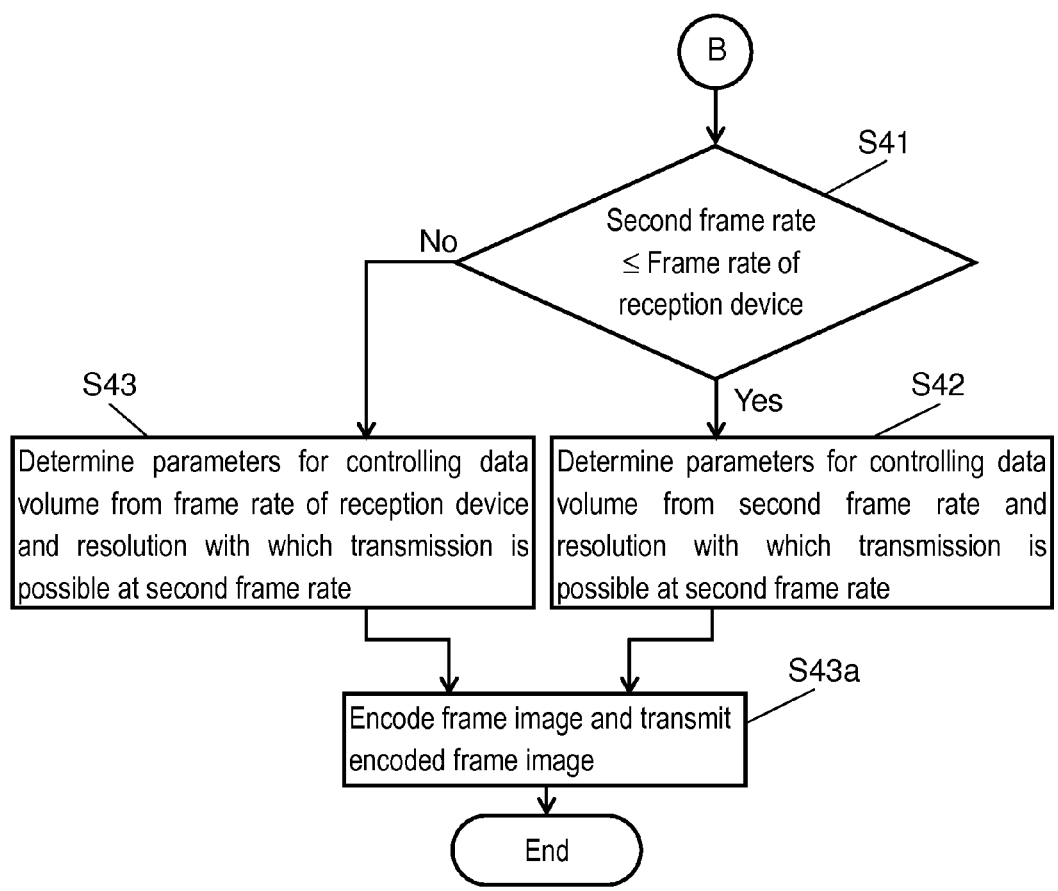

FIG. 6

| Load state of encoder / Resolution of frame image | Load state 5 | Load state 4 | Load state 3 | Load state 2 | Load state 1 |
|---|---|---|---|---|---|
| 1920×1080 | 3fps | 7fps | 15fps | 24fps | 30fps |
| 1280×720 | 7fps | 15fps | 24fps | 30fps | 30fps |
| 720×480 | 15fps | 24fps | 30fps | 30fps | 30fps |
| 320×240 | 24fps | 30fps | 30fps | 30fps | 30fps |
| 160×120 | 30fps | 30fps | 30fps | 30fps | 30fps |

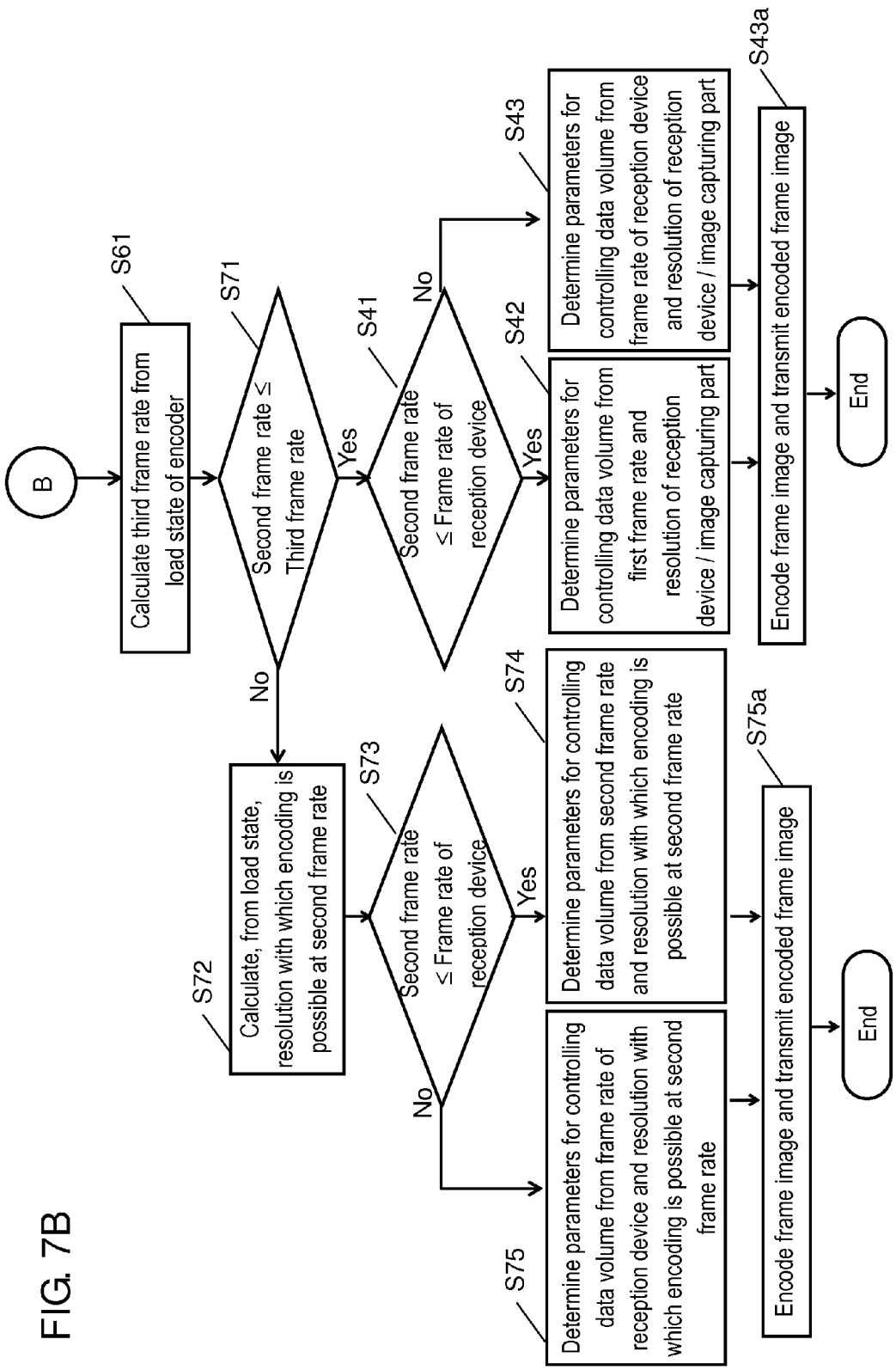

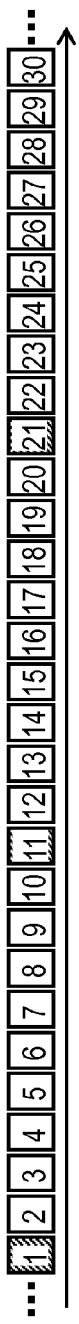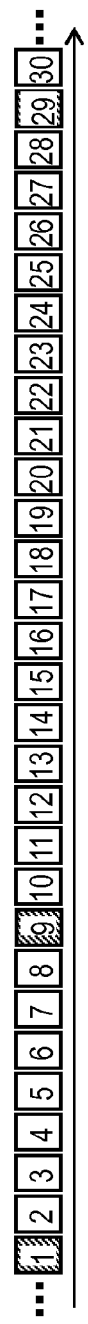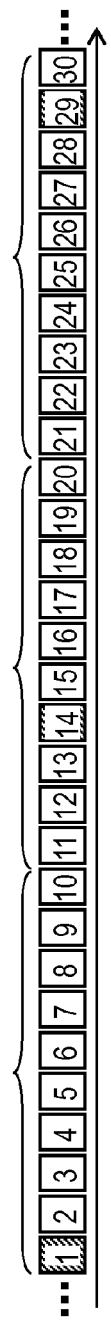

TRANSMISSION DEVICE AND TRANSMISSION METHOD

RELATED APPLICATIONS

This application is the U.S. National Phase under 35 U.S.C. §371 of International Application No. PCT/JP2012/004501, filed on Jul. 12, 2012, which in turn claims the benefit of Japanese Application No. 2011-156402, filed on Jul. 15, 2011, the disclosures of which Applications are incorporated by reference herein.

TECHNICAL FIELD

The present disclosure relates to a transmission device and a transmission method for encoding a captured frame image and transmitting the encoded frame image to a reception device through a network. The present disclosure particularly relates to a transmission device and a transmission method for adaptively controlling a data volume of a captured frame image based on a size of a motion of the captured frame image, viewing conditions of a reception device, and a congestion degree of a network.

BACKGROUND ART

In recent years, there are increasing opportunities for conducting digital video communications such as videophone communications by use of large-screen televisions. In conducting digital video communications, there are limits on a volume of data communicable per unit time, with a bandwidth of a network set as the upper limit. For this reason, in normal digital video communications, a volume of data to be communicated is reduced by use an algorithm which compresses a frame image of digital video. However, when the volume of data to be communicated is large, the bandwidth of the network may become insufficient even by use of the compression algorithm. This results in occurrence of missing data or the like in received data As a method for solving the above problem, a method for reducing a data amount is performed on data before compression. For example, there has been disclosed a method in which a frame image is selected from frame images photographed by a camera in accordance with a traffic state and the selected frame image is compressed and outputted to an external device (e.g., PTL 1).

However, simply selecting the frame image in accordance with the traffic state may cause unnatural motion of a subject that is displayed in the external device, which has been problematic.

CITATION LIST

Patent Literature

PTL 1: Unexamined Japanese Patent Publication No. H10-42185

SUMMARY OF THE INVENTION

A transmission device in the present disclosure transmits a plurality of encoded frame images to a reception device connected through a network, and includes an image capturing part, an analyzer, a viewing condition receiver, a network bandwidth measurement part, a controller, an encoder, and a transmitter. The image capturing part captures a subject and generates a plurality of temporally successive frame images. The analyzer analyzes a size of a motion of the subject by use of at least two or more of the frame images generated in the image capturing part. The viewing condition receiver receives viewing conditions from the reception device. The network bandwidth measurement part measures a congestion degree of the network. The controller controls a data volume of the plurality of frame images generated in the image capturing part based on the size of the motion of the subject, the viewing conditions, and the congestion degree of the network, to determine a predetermined parameter for encoding. The encoder encodes the plurality of frame images based on the predetermined parameters. The transmitter transmits the plurality of encoded frame images.

Further, a transmission method in the present disclosure is performed in a transmission device which transmits an encoded frame image to a reception device connected through a network. The transmission method includes: capturing a subject and generating a plurality of temporally successive frame images; analyzing a size of a motion of the subject by use of at least two or more of the generated frame images; receiving viewing conditions from the reception device; and measuring a congestion degree of the network. The transmission method controls a data volume of the plurality of generated frame images based on the size of the motion of the subject, the viewing conditions, and the congestion degree of the network, to determine predetermined parameters for encoding; encodes the plurality of frame images based on the predetermined parameter; and transmits the plurality of encoded frame images.

According to the transmission device and the transmission method of the present disclosure, in a transmission device and a transmission method for encoding a captured frame image and transmitting the encoded frame image to a reception device through a network, the data volume of the captured frame image is adaptively controlled based on a size of a motion of the captured frame image, viewing conditions of the reception device, and a congestion degree of the network. Therefore, the motion of the subject captured in the transmission device can be reproduced in the reception device by use of the maximum possible resolution.

BRIEF DESCRIPTION OF DRAWINGS

FIG. 1 is a block diagram showing a configuration of a transmission device according to a first embodiment.

FIG. 2A is a schematic diagram showing a frame rate, at which transmission is possible with respect to each predetermined resolution of a frame image in a reception device or an image capturing part in each of various substantial bandwidths of a network, and which is held in the transmission device according to the first embodiment.

FIG. 2B is a schematic diagram showing the relation between a size of a motion of a subject and the frame rate of the frame image, which is held in the transmission device according to the first embodiment.

FIG. 3A is a flowchart showing a procedure for the transmission device according to the first embodiment to control a data volume of a plurality of frame images and transmit the frame images to the reception device.

FIG. 3B is a flowchart showing a procedure for the transmission device according to the first embodiment to control the data volume of the plurality of frame images and transmit the frame images to the reception device.

FIG. 3C is a flowchart showing a procedure for the transmission device according to the first embodiment to control the data volume of the plurality of frame images and transmit the frame images to the reception device.

FIG. 6 is a schematic diagram showing a frame rate, at which encoding is possible with respect to each predetermined resolution of a frame image in the reception device or the image capturing part in each of various load states of an encoder, and which is held in the transmission device according to the second embodiment.

FIG. 7B is a flowchart showing a procedure for the transmission device according to the second embodiment to control the data volume of the plurality of frame images and transmit the frame images to the reception device.

FIG. 8A is a schematic diagram showing a state where a part of a plurality of temporally successive frame images generated in the image capturing part is selected at the time of controlling a data volume of the plurality of temporally successive frame images in accordance with the frame rate of the frame image.

FIG. 8B is a schematic diagram showing a state where a part of the plurality of temporally successive frame images generated in the image capturing part is selected at the time of controlling a data volume of the plurality of temporally successive frame images in accordance with the frame rate of the frame image.

FIG. 8C is a schematic diagram showing a state where a part of the plurality of temporally successive frame images generated in the image capturing part is selected at the time of controlling a data volume of the plurality of temporally successive frame images in accordance with the frame rate of the frame image.

DESCRIPTION OF EMBODIMENTS

Figure 4:
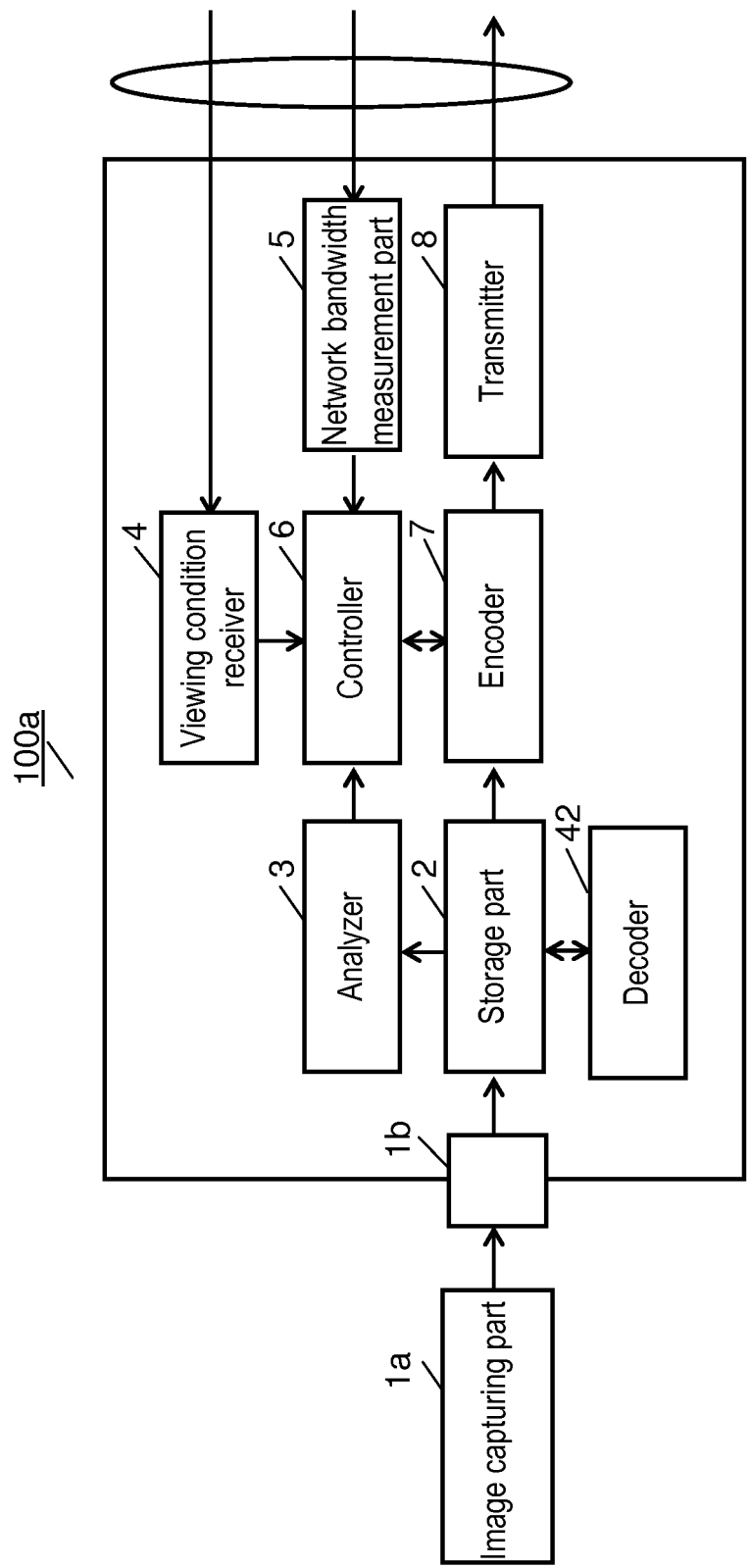
FIG. 4 is a block diagram showing another configuration of the transmission device according to a first embodiment.

Hereinafter, embodiments will be described in detail with reference to the drawings as necessary. However, a description in more detail than necessary may be omitted. For example, a detailed description of a well-known matter and a duplicate description of substantially the same configuration may be omitted. This is to prevent the following description from being unnecessarily redundant and to facilitate understanding of a person skilled in the art.

It is to be noted that the inventors provide the attached drawings and the following description in order for the person skilled in the art to fully understand the present disclosure, and the subject matter recited in the claims is not intended to be restricted thereby.

First Exemplary Embodiment

Hereinafter, a first embodiment will be described with reference to FIGS. 1 to 4.

Configuration and Function of Transmission Device 100

FIG. 1 is a block diagram showing a configuration of transmission device 100 according to a first embodiment of the present invention. Transmission device 100 includes image capturing part 1, storage part 2, analyzer 3, viewing condition receiver 4, network bandwidth measurement part 5, controller 6, encoder 7, and transmitter 8. Hereinafter, a configuration and a function of each part of transmission device 100 will be described.

Image capturing part 1 is a video camera provided with a solid-state image sensing device such as a CCD (Charge Coupled Device). Image capturing part 1 captures an image of a subject every predetermined time, generates a plurality of temporally successive frame images and outputs the generated frame images to storage part 2.

Storage part 2 is, for example, storage means configured by a volatile memory, a nonvolatile memory, or the like. Storage part 2 stores a plurality of frame images constituted by digital data generated in image capturing part 1. Then, storage part 2 outputs the plurality of stored frame images to analyzer 3 and encoder 7 as necessary.

Analyzer 3 specifies the subject from the plurality of frame images stored in storage part 2. That is, analyzer 3 specifies the subject by use of at least two or more of the frame images generated in image capturing part 1. Analyzer 3 then analyzes a size of a motion of the specified subject. Further, analyzer 3 outputs an analyzed result to controller 6.

In addition, in order to specify the subject from the plurality of frame images, for example, analyzer 3 may specify a face of an operator by template matching between the plurality of frame images and the stored data base, to specify the subject. Therefore, a face image of the operator of transmission device 100 is desirably stored as the data base of analyzer 3. Further, although various other methods are applicable, descriptions thereof are omitted herein.

Moreover, in order to analyze the size of the motion of the subject, for example, analyzer 3 may detect a motion vector by a motion vector detecting method by use of at least two or more frame images. Analyzer 3 then regards an absolute value of a quantity of the detected motion vector as the size of the motion of the subject. Note that the method for analyzing the size of the motion of the subject is not limited to the above, and there are various other methods such as a method of detecting an edge of the subject from a frame image and detecting a change in position of the detected edge of the subject by use of at least two or more frame images, but descriptions thereof are omitted here.

Viewing condition receiver 4 receives viewing conditions from a reception device (not shown), and outputs the received viewing conditions to controller 6. The viewing conditions are video display capabilities of the reception device, and are information which includes, for example, a resolution and a frame rate of a frame image, and the like. Specifically, the viewing conditions are information such as 1920×1080 pixels as the resolution of the frame image and 30 fps (frame per second) as the frame rate thereof, or 1280×720 pixels as the resolution of the frame image and 15 fps as the frame rate thereof. Note that the viewing conditions are not limited to the video display capabilities of the reception device, but may be a resolution and a frame rate of a frame image specified on the reception device by an operator of the reception device, for example.

Network bandwidth measurement part 5 measures a substantial bandwidth of a network which is usable at the time of transmitting/receiving a plurality of frame images between transmission device 100 and reception device (not shown), namely, a congestion degree of the network. Then, network bandwidth measurement part 5 outputs the congestion degree of the network to controller 6.

In order to measure the congestion degree of the network, the time may be measured from when transmission device 100 transmits a plurality of frame images to the reception device and until acknowledgement that the frame images are received is returned from the reception device to transmission device 100. That is, the congestion degree of the network can be measured by use of the elapsed time from transmission to reception of the plurality of frame images.

Controller 6 controls the whole of transmission device 100. For example, controller 6 determines predetermined parameters based on the size of the motion of the subject outputted from analyzer 3, the viewing conditions of the reception device outputted from viewing condition receiver 4, and the congestion degree of the network outputted from network bandwidth measurement part 5. Here, the predetermined parameters are parameters for encoding by controlling a data volume of the plurality of frame images generated in image capturing part 1 and stored in storage part 2.

Specifically, controller 6 adaptively determines a resolution and a frame rate of a plurality of frame images to be transmitted from transmission device 100 to the reception device based on the size of the motion of the subject outputted from analyzer 3, the viewing conditions of the reception device outputted from viewing condition receiver 4, and the congestion degree of the network outputted from network bandwidth measurement part 5. Controller 6 then notifies encoder 7 of the determined resolution and frame rate of the frame image as predetermined parameters.

Although the resolution and the frame rate of the frame image are used as the predetermined parameters in the present embodiment, the present invention is not limited thereto, and other information may be further included. Other information will be described later.

Encoder 7 encodes the plurality of frame images outputted from storage part 2 based on the resolution and the frame rate of the frame image as the predetermined parameters notified from controller 6. Encoder 7 then outputs the plurality of encoded frame images to transmitter 8. As a method of encoding, the MPEG (Moving Picture Experts Group) method and various other encoding methods can be adopted. By adopting such an encoding method, various types of information such as a resolution, a frame rate, and a compression method of a frame image may be included in transmission data.

Transmitter 8 transmits the plurality of encoded frame images outputted from encoder 7 to the reception device through the network. As described above, transmission device 100 in the present embodiment is a device for transmitting a plurality of encoded frame images to the reception device connected through the network.

Flow for Controlling Data Volume of Frame Image

Hereinafter, a flow for controlling a data volume of a frame image in transmission device 100 will be described with reference to FIGS. 1 to 3. FIG. 2A is a schematic diagram showing a frame rate (unit: fps (frame per second) at which transmission/reception is possible with respect to each predetermined resolution (unit; pixel) of a frame image in the reception device or image capturing part 1 in each of various substantial bandwidths (unit: bps (bit per second) of the network, and which is held in transmission device 100 according to the first embodiment. Here, the schematic diagram of FIG. 2A shows the substantial bandwidth of the network in a horizontal direction, and the predetermined resolution of the transmissible/receivable frame image in a vertical direction. FIG. 2A then shows the frame rate at which transmission/reception of the frame image having the predetermined resolution is possible in the above substantial bandwidth.

Specifically, as shown in FIG. 2A, for example, when the substantial bandwidth of the network is 0.8 Mbps and the resolution of the frame image of the reception device is 1920×1080 pixels, the frame rate of the frame image transmissible from transmission device 100 to the reception device is 7 ps. Here, the substantial bandwidth of the network is a substantial bandwidth in which transmission device 100 of the present embodiment can transmit a plurality of frame images. That is, the substantial bandwidth of the network is assumed to fluctuate due to communications with other devices connected to this network.

Further, FIG. 2B is a schematic diagram showing the relation between the size of the motion of the subject and the frame rate (unit: fps) of the frame image, which is held in transmission device 100 according to the first embodiment. Specifically, the size of the motion of the subject, analyzed in analyzer 3, is classified into five levels. In each level (1 to 5) of the size of the motion of the subject, there is shown the minimum necessary frame rate of the frame image for reproducing, in the reception device, the motion of the subject captured in image capturing part 1. As shown in FIG. 2B, as the motion of the subject captured in image capturing part 1 becomes larger, the frame rate required for reproducing, in the reception device, the motion of the subject captured in image capturing part 1 becomes higher.

It is shown that, for example, when the size of the motion of the subject analyzed in analyzer 3 is classified as Level 5, that is, when the size of the motion of the subject is classified as the highest level out of the five levels, 30 fps or higher is required as the frame rate for reproducing, in the reception device, the motion of the subject captured in image capturing part 1. Therefore, when the size of the motion of the subject is Level 5, the motion of the subject reproduced in the reception device is unnatural in the case of the frame rate being lower than 30 fps. "The motion being unnatural" indicates the degree to which the viewer loses sight of the subject or becomes unable to grasp its motion. For example, in a case where motion vectors of the subject are different in each of five images successively filmed per unit time, the viewer may lose sight of the subject or become unable to grasp the motion thereof when the image within the five images are thinned out.

On the other hand, in a case where the motion of the subject is small or the direction of the motion vector is fixed in each of five images, even when three images are deleted to leave the first and the last image, interpolation is possible from the first image and the last image. Therefore, in such a case, even when the frame image is transmitted with its frame rate made low, the viewer is unlikely to lose sight of the subject. From the viewpoint described above, analyzer 3 respectively weighs and quantizes the switching frequency of the vector direction and the moving range and speed of the subject. Analyzer 3 then specifies the size of the motion of the subject into five levels.

In FIGS. 2A and 2B, the frame rate is changed in stages based on the substantial bandwidth of the network and the size of the motion of the subject captured in the reception device or image capturing part 1. However, the present invention is not limited thereto. For example, in FIG. 2A, the frame rate may be changed linearly in accordance with the change in substantial bandwidth of the network, and similarly in FIG. 2B, the frame rate may be changed linearly in accordance with the change in size of the motion of the subject.

Note that transmission device 100 may hold the information shown in FIGS. 2A and 2B either in storage part 2 or controller 6.

FIGS. 3A, 3B, and 3C are flowcharts showing a procedure for transmission device 100 according to the first embodiment to control a data volume of frame images and transmit the frame images to the reception device. Unless otherwise noted, a description is given based on conditions described below. That is, as for the viewing conditions of the reception device, the resolution of the frame image is 1920×1080 pixels and the frame rate is 30 fps. Further, as for the image capturing capabilities of the image capturing part, the resolution of the frame image is 1280×720 pixels and the frame rate is 30 fps. Moreover, the substantial bandwidth of the network is set to 0.8 Mbps. Furthermore, the size of the motion of the subject analyzed in analyzer 3 is Level 2. That is, in the above conditions, the minimum required frame rate for reproducing, in the reception device, the motion of the subject captured in image capturing part 1 is 7 fps.

First, when connection is established between transmission device 100 and the reception device, viewing condition receiver 4 receives from the reception device the resolution and the frame rate of the frame image as the viewing conditions of the reception device. Viewing condition receiver 4 then passes the received viewing conditions of the reception device to controller 6 (step S31). As described above, the resolution and the frame rate of the frame image, i.e., the viewing conditions of the reception device, are 1920×1080 pixels and 30 fps, respectively.

Next, controller 6 compares the resolution of the frame image as the image capturing capability of image capturing part 1 with the resolution of the frame image received from the reception device (step S32). When the resolution of the frame image received from the reception device is higher than the resolution of the frame image generated in image capturing part 1 (step S32 "Yes"), controller 6 calculates a frame rate of the frame image transmissible from transmission device 100 to the reception device as the first frame rate from the corresponding relation between the substantial bandwidth of the network (congestion degree of the network) and the predetermined resolution of the frame image generated in image capturing part 1 which is shown in FIG. 2A (step S33).

On the other hand, when the resolution of the frame image received from the reception device is equal to or lower than the resolution of the frame image generated in image capturing part 1 ("No" in step S32), controller 6 calculates a frame rate of the frame image transmissible from transmission device 100 to the reception device as the first frame rate from the corresponding relation between the substantial bandwidth of the network (congestion degree of the network) and the predetermined resolution of the frame image received from the reception device which is shown in FIG. 2A (step S34).

As described above, the resolution of the frame image received from the reception device is 1920×1080, and is higher than 1280×720 pixels which is the predetermined resolution of the frame image generated in image capturing part 1 (step S32 "Yes"). Hence, with reference to FIG. 2A, controller 6 calculates 15 fps as the first frame rate of the frame image transmissible from transmission device 100 to the reception device, from 0.8 Mbps being the substantial bandwidth of the network and 1280×720 pixels being the predetermined resolution of the frame image generated in image capturing part 1.

Next, controller 6 calculates as a second frame rate a frame rate required for reproducing, in the reception device, the motion of the subject captured in image capturing part 1 from the size of the motion of the subject outputted from analyzer 3 (step S35). As described above, since the size of the motion of the subject analyzed in analyzer 3 is Level 2, the minimum required second frame rate for reproducing, in the reception device, the motion of the subject captured in image capturing part 1 is 7 fps.

Subsequently, controller 6 compares the first frame rate with the second frame rate (step S36).

When the first frame rate is equal to or higher than the second frame rate ("Yes" in step S36), as shown in FIG. 3B, controller 6 compares the first frame rate with the frame rate of the frame image received from the reception device (step S38).

When the first frame rate is equal to or lower than that frame rate ("Yes" in step S38), controller 6 determines that the resolution of the frame image to be transmitted from transmission device 100 to the reception device is the resolution of the frame image generated in image capturing part 1 ("Yes" in step S32) or the resolution of the frame image received from the reception device ("No" in step S32). Further, controller 6 determines that the frame rate of the frame image to be transmitted from transmission device 100 to the reception device is the first frame rate. Controller 6 then notifies encoder 7 of the determined resolution and frame rate as predetermined parameters for encoding (step S39).

On the other hand, when the first frame rate is higher than the frame rate of the frame image received from the reception device ("No" in step S38), controller 6 determines that the resolution of the frame image to be transmitted from transmission device 100 to the reception device is the resolution of the frame image generated in image capturing part 1 ("Yes" in step S32) or the resolution of the frame image received from the reception device ("No" in step S32). Further, controller 6 determines that the frame rate is the frame rate of the frame image received from the reception device. Controller 6 then notifies encoder 7 of the determined resolution and frame rate of the frame image as predetermined parameters for encoding (step S40).

Encoder 7 encodes the frame image by a predetermined encoding method by use of the resolution and the frame rate of the frame image which have been notified from controller 6, and outputs the encoded frame image to transmitter 8. Transmitter 8 then transmits the frame image encoded in encoder 7 to the reception device through the network (step S40a).

As described above, in the present embodiment, the first frame rate (15 fps) is higher than the second frame rate (7 fps) ("Yes" in step S36), and the first frame rate (15 fps) is lower than the frame rate (30 fps) of the frame image received from the reception device ("Yes" in step S38). Accordingly, controller 6 determines that the resolution of the frame image to be transmitted from transmission device 100 to the reception device is 1280×720 pixels which is the resolution of the frame image generated in image capturing part 1. Further, controller 6 determines that the frame rate of the frame image to be transmitted from transmission device 100 to the reception device is 15 fps which is the first frame rate. Controller 6 then notifies encoder 7 of the determined resolution and frame rate as predetermined parameters for encoding (step S39).

Encoder 7 encodes the frame image by the predetermined encoding method by use of the resolution and the frame rate which have been notified from controller 6, and outputs the encoded frame image to transmitter 8. Transmitter 8 then transmits the frame image encoded in encoder 7 to the reception device through the network (step S40a).

On the other hand, when the first frame rate is lower than the second frame rate ("No" in step S36), controller 6 calculates a resolution with which transmission is possible from transmission device 100 to the reception device, from the corresponding relation between the substantial bandwidth of the network and the second frame rate shown in FIG. 2A (step S37).

Subsequently, controller 6 compares the second frame rate with the frame rate of the reception device (step S41)

When the second frame rate is equal to or lower than the frame rate of the frame image received from the reception device ("Yes" in step S41), controller 6 determines that the resolution of the frame image to be transmitted from transmission device 100 to the reception device is the resolution with which transmission is possible from transmission device 100 to the reception device at the second frame rate. Further, controller 6 determines that the frame rate of the frame image to be transmitted from transmission device 100 to the reception device is the second frame rate. Controller 6 then notifies encoder 7 of the determined resolution and frame rate (step S42).

Encoder 7 encodes the frame image by the predetermined encoding method by use of the resolution and the frame rate which have been notified from controller 6, and outputs the encoded frame image to transmitter 8. Transmitter 8 then transmits the frame image encoded in encoder 7 to the reception device through the network (step S43*a*).

On the other hand, when the second frame rate is higher than the frame rate of the reception device ("No" in step S41), controller 6 determines that the resolution of the frame image to be transmitted from transmission device 100 to the reception device is the resolution with which transmission is possible from transmission device 100 to the reception device at the second frame rate. Further, controller 6 determines that the frame rate of the frame image to be transmitted from transmission device 100 to the reception device is the frame rate of the reception device. Controller 6 then notifies encoder 7 of the determined resolution and frame rate (step S43).

Encoder 7 encodes the frame image by the predetermined encoding method by use of the resolution and the frame rate which have been notified from controller 6, and outputs the encoded frame image to transmitter 8. Transmitter 8 then transmits the frame image encoded in encoder 7 to the reception device through the network (step S43*a*).

Here, it is assumed that the size of the motion of the subject analyzed in analyzer 3 is Level 4, that is, the second frame rate calculated in step S35 is 24 fps. Since the first frame rate (15 fps) is lower than the second frame rate (24 fps) ("No" in step S36), controller 6 calculates 720×480 pixels as the resolution of the frame image transmissible from transmission device 100 to the reception device, from 0.8 Mbps being the substantial bandwidth of the network and the second frame rate (24 fps) shown in FIG. 2A (step S37).

Next, since the second frame rate (24 fps) is lower than the frame rate (30 fps) of the reception device (step S41 "Yes"), controller 6 determines that the resolution of the frame image to be transmitted from transmission device 100 to the reception device is 720×480 pixels being the resolution of the frame image with which transmission is possible at the second frame rate (24 fps). Further, controller 6 determines that the frame rate of the frame image to be transmitted from transmission device 100 to the reception device is the second frame rate (24 fps). Controller 6 then notifies encoder 7 of the determined resolution and frame rate (step S42).

Encoder 7 encodes the frame image by the predetermined encoding method by use of the resolution and the frame rate which have been notified from controller 6, and outputs the encoded frame image to transmitter 8. Transmitter 8 then transmits the frame image encoded in encoder 7 to the reception device through the network (step S43*a*).

As described above, according to transmission device 100 and the transmission method of the present embodiment, in transmission device 100 and the transmission method for encoding a captured frame image and transmitting the encoded frame image to the reception device through the network, a resolution and a frame rate of the captured frame image are adaptively controlled based on a size of a motion of the captured frame image, viewing conditions of the reception device, and a congestion degree of the network. As a result, the motion of the subject captured in transmission device 100 can be reproduced in the reception device by use of the maximum possible resolution.

In addition, as shown in FIG. 1, transmission device 100 according to the present embodiment includes image capturing part 1 in a housing of transmission device 100. However, as shown in FIG. 4, in another transmission device 100*a* according to the present embodiment, image capturing part 1*a* is installed outside the housing of transmission device 100. Image capturing part 1*a* is electrically connected with transmission device 100*a* in a wired or wireless manner through connector 1*b*. That is, image capturing part 1*a* is used by being connected to transmission device 100*a*. Therefore, transmission device 100*a* includes connector 1*b*, storage part 2, analyzer 3, viewing condition receiver 4, network bandwidth measurement part 5, controller 6, encoder 7, and transmitter 8, while image capturing part 1*a* is connected to connector 1*b*. Further, transmission device 100*a* further includes decoder 42 connected to storage part 2.

According to the above configuration, when image capturing part 1*a* is a camera connected by an HDMI (High-Definition Multimedia Interface) or the like, video data of a base band which is not encoded is inputted into storage part 2 through connector 1*b*.

With such a configuration, in the case where image capturing part 1*a* is connected, a basic function and operation of another transmission device 100*a* in the present embodiment remain unchanged from those of transmission device 100. Therefore, by encoding, in transmission device 100*a*, a plurality of frame images of the subject captured in image capturing part 1*a* and transmitting the plurality of encoded frame images through the network, the plurality of encoded frame images can be reproduced in the reception device by use of the maximum possible resolution.

When image capturing part 1*a* is a camera connected by a USB (Universal Serial Bus) or the like, it is assumed that video data encoded and compressed by MPEG2-H.264 (Moving Picture Experts Group Phase 2-H.264) or the like is outputted from the camera due to the problem of a bandwidth of an outputted signal. In such a case, data stored in storage part 2 is once decoded in decoder 42 connected to storage part 2, and thereafter re-inputted and stored into storage part 2. That is, decoder 42 generates a decoded signal from a plurality of temporally successive encoded frame images generated in image capturing part 1*a*. Decoder 42 then inputs and stores the decoded signal into storage part 2. Although not illustrated, decoder 42 may be controlled by controller 6.

In this manner, as described above, even in the case where image capturing part 1*a* is connected, the basic function and operation of transmission device 100*a* remain unchanged from those of transmission device 100, except for decoder 42. Therefore, by encoding, in transmission device 100*a*, a plurality of frame images of the subject captured in image capturing part 1*a* and transmitting the plurality of encoded frame images through the network, the plurality of encoded frame images can be reproduced in the reception device by use of the maximum possible resolution.

Second Exemplary Embodiment

Hereinafter, a second embodiment will be described with reference to FIGS. 5 to 8C.

Configuration and Function of Transmission Device 400

Figure 5:
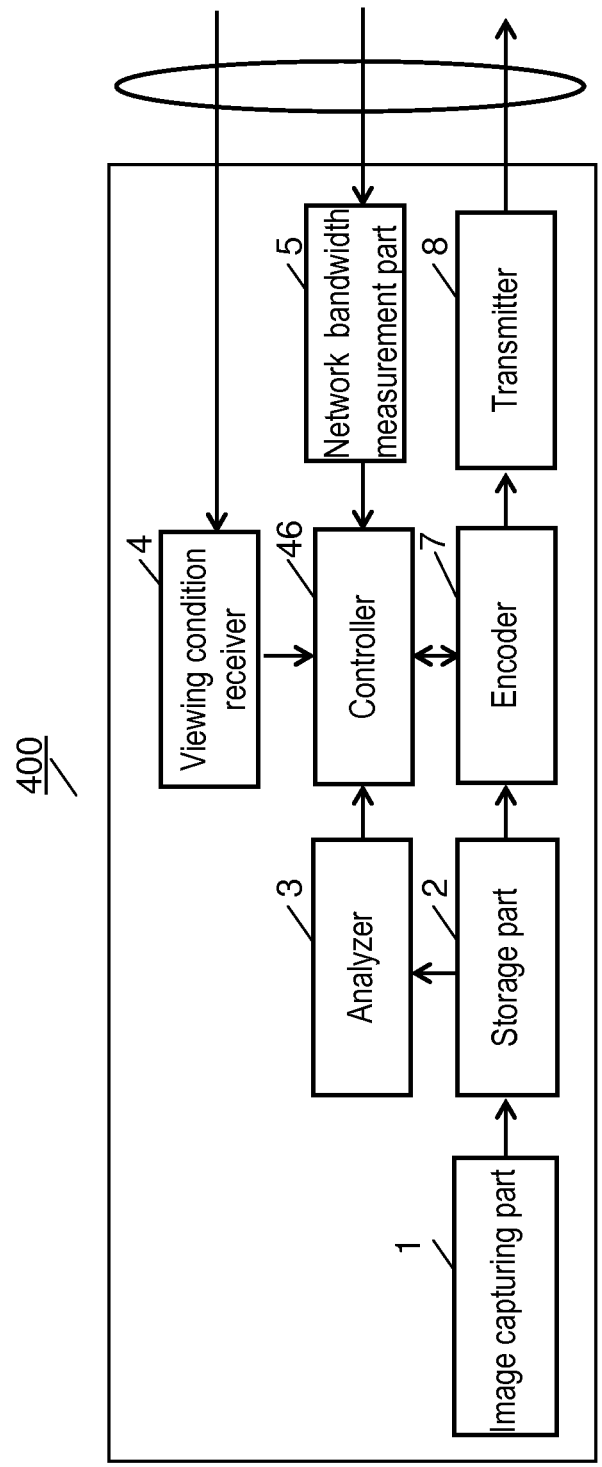
FIG. 5 is a block diagram showing a configuration of a transmission device according to a second embodiment.

FIG. 5 is a block diagram showing a configuration of transmission device 400 according to the second embodiment. Transmission device 400 includes image capturing part 1, storage part 2, analyzer 3, viewing condition receiver 4, network bandwidth measurement part 5, controller 46, encoder 7, and transmitter 8. Hereinafter, a configuration and a function of each part of transmission device 400 will be described.

Transmission device 400 is different from transmission device 100 according to the first embodiment in that controller 46 is provided in place of controller 6. The configurations other than controller 46 are the same as those of transmission device 100, and the detailed descriptions thereof are thus omitted.

Controller 46 includes the following function in addition to the function of controller 6. In addition to the size of the motion of the subject outputted from analyzer 3, the viewing conditions of the reception device outputted from viewing condition receiver 4, and the congestion degree of the network outputted from network bandwidth measurement part 5, controller 46 controls a data volume of a plurality of frame images stored in storage part 2 based on a load state of encoder 7, to determine predetermined parameters for encoding.

Specifically, controller 46 adaptively determines a predetermined resolution and a frame rate of a frame image to be transmitted from transmission device 400 to the reception device based on the size of the motion of the subject outputted from analyzer 3, the viewing conditions of the reception device outputted from viewing condition receiver 4, the congestion degree of the network outputted from network bandwidth measurement part 5, and the load state of encoder 7. Controller 46 then notifies encoder 7 of the predetermined resolution and frame rate of the determined frame image as predetermined parameters for encoding. Here, the load state is a state that occurs when encoder 7 implements a function other than encoding according to the present embodiment, and the like.

That is, for example, encoder 7 can encode a frame image with a resolution of 1920×1080 pixels at a frame rate of 30 fps in a certain situation. However, in another situation, that is, in a load state, encoder 7 can encode a frame image with a resolution of 1920×1080 pixels only at a frame rate of 15 fps.

Flow for Controlling Data Volume of Frame Image

Hereinafter, a flow for controlling a data volume of a frame image in transmission device 400 will be described with reference to FIGS. 5 to 7B.

FIG. 6 is a schematic diagram showing a frame rate, at which encoding is possible with respect to each predetermined resolution of a frame image in the reception device or image capturing part 1 in each of various load states of the encoder, and which is held in the transmission device according to the second embodiment.

Figure 7A:
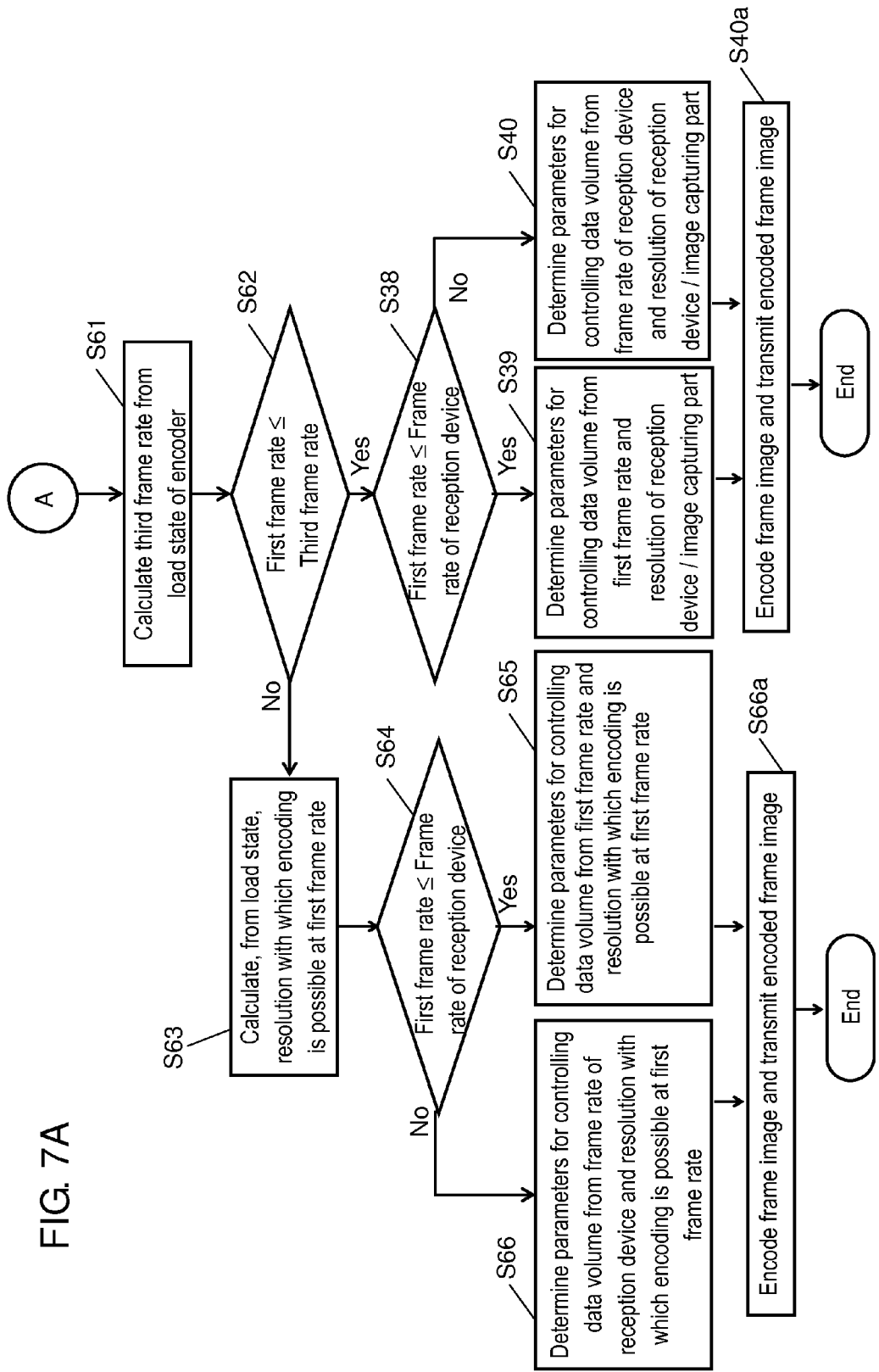
FIG. 7A is a flowchart showing a procedure for the transmission device according to the second embodiment to control a data volume of a plurality of frame images and transmit the frame images to the reception device.

FIGS. 7A and 7B are flowcharts showing a procedure for transmission device 400 according to the second embodiment to control the data volume of the plurality of frame images and transmit the frame images to the reception device.

Unless otherwise noted, the viewing conditions of the reception device are 1920×1080 pixels of the resolution of the frame image and 30 fps of the frame rate. Further, as for the image capturing capabilities of image capturing part 1 are 1280×720 pixels of the resolution of the frame image and 30 fps of the frame rate, and further, the substantial bandwidth of the network is 0.8 Mbps. Moreover, the size of the motion of the subject analyzed in analyzer 3 is Level 2. That is, the minimum required frame rate for reproducing, in the reception device, the motion of the subject captured in image capturing part 1 is 7 fps. Further, the load state of encoder 7 is Load state 5.

Note that the operations from step S31 to step S43 of FIG. 3A are the same operations as those in transmission device 100 according to the first embodiment. Hence, the descriptions thereof are omitted here. The description starts with controller 46 comparing the first frame rate with the second frame rate in step S36 of FIG. 3A.

First, when the first frame rate is equal to or higher than the second frame rate ("Yes" in step S36), the process goes to step S61 of FIG. 7A. Then, controller 46 calculates a third frame rate being a frame rate at which encoding is possible in encoder 7 with reference to FIG. 6 based on the resolution of the frame image of the reception device ("Yes" in step S32) or the resolution of the frame image generated in image capturing part 1 ("No" in step S32), based on the load state of encoder 7 (step S61).

As described above, encoder 7 is in Load state 5 and the resolution of the frame image generated in image capturing part 1 is 1280×720 pixels. Therefore, the frame rate at which encoding is possible in encoder 7 is 7 fps as the third frame rate.

Subsequently, controller 46 compares the first frame rate with the third frame rate (step S62). When the first frame rate is equal to or lower than the third frame rate ("Yes" in step S62), the process goes to step S38. Subsequent operations are the same as those in transmission device 100 according to the first embodiment of the present invention. Hence, the descriptions thereof are omitted here.

On the other hand, when the first frame rate is higher than the third frame rate ("No" in step S62), controller 46 calculates a resolution with which encoding is possible at the first frame rate in encoder 7 from the load state of encoder 7 with reference to FIG. 6 (step S63).

As described above, encoder 7 is in Load state 5 and the first frame rate is 15 fps. Therefore, when the first frame rate is 15 fps, the resolution with which encoding is possible in encoder 7 is 720×480 pixels.

Subsequently, controller 46 compares the first frame rate with the frame rate of the frame image received from the reception device (step S64). When the first frame rate is equal to or lower than the frame rate of the frame image received from the reception device ("Yes" in step S64), controller 46 determines that the resolution of the frame image to be transmitted from transmission device 400 to the reception device is the resolution with which encoding is possible at the first frame rate in encoder 7. Further, controller 46 determines that the frame rate of the frame image to be transmitted from transmission device 400 to the reception device is the first frame rate. Controller 46 then notifies encoder 7 of the determined resolution and frame rate (step S65).

Encoder 7 encodes the frame image by the predetermined encoding method by use of the resolution and the frame rate which have been notified from controller 46, and outputs the encoded frame image to transmitter 8. Transmitter 8 then transmits the frame image encoded in encoder 7 to the reception device through the network (step S66a).

On the other hand, when the first frame rate is higher than the frame rate of the reception device ("No" in step S64), controller 46 determines that the resolution of the frame image to be transmitted from transmission device 400 to the reception device is the resolution with which encoding is possible at the first frame rate in encoder 7. Further, controller 46 determines that the frame rate of the frame image to be transmitted from transmission device 400 to the reception device is the frame rate of the reception device. Controller 46 then notifies encoder 7 of the determined resolution and frame rate (step S66).

As described above, since the first frame rate of 15 fps is lower than the frame rate of 30 fps ("Yes" in step S64), controller 46 determines that the resolution of the frame image to be transmitted from transmission device 400 to the reception device is 720×480 pixels being the resolution with which encoding is possible at the first frame rate of 15 fps in encoder 7. Further, controller 46 determines that the frame rate of the frame image to be transmitted from transmission device 400 to the reception device is the first frame rate of 15 fps. Controller 46 then notifies encoder 7 of the determined resolution and frame rate.

Returning to step S36 of FIG. 3, when the first frame rate is lower than the second frame rate ("No" in step S36), the process goes to step S61 of FIG. 7B. Then, based on the load state of encoder 7, controller 46 calculates the third frame rate as a frame rate at which encoding is possible in encoder 7 with reference to FIG. 6 based on the resolution of the frame image of the reception device ("Yes" in step S32) or the resolution of image capturing part 1 ("No" in step S32) (step S61).

As described above, encoder 7 is in Load state 5 and the resolution of the frame image generated in image capturing part 1 is 1280×720 pixels. Therefore, the third frame rate at which encoding is possible in encoder 7 is 7 fps.

Subsequently, controller 46 compares the second frame rate with the third frame rate (step S71). When the second frame rate is equal to or lower than the third frame rate ("Yes" in step S71), the process goes to step S41. Subsequent operations are the same as those in transmission device 100 according to the first embodiment. Hence, the descriptions thereof are omitted here.

On the other hand, when the second frame rate is higher than the third frame rate ("No" in step S71), controller 46 calculates a resolution with which encoding is possible at the second frame rate in encoder 7 from the load state of encoder 7 with reference to FIG. 6 (step S72).

As described above, encoder 7 is in Load state 5 and the second frame rate is 24 fps. Therefore, when the second frame rate is 24 fps, the resolution with which encoding is possible in encoder 7 is 320×240 pixels.

Subsequently, controller 46 compares the second frame rate with the frame rate of the reception device (step S73). When the second frame rate is equal to or lower than the frame rate of the reception device ("Yes" in step S73), controller 46 determines that the resolution of the frame image to be transmitted from transmission device 400 to the reception device is the resolution with which encoding is possible at the second frame rate in encoder 7. Further, controller 46 determines that the frame rate of the frame image to be transmitted from transmission device 400 to the reception device is the second frame rate. Controller 46 then notifies encoder 7 of the determined resolution and frame rate (step S74).

Encoder 7 encodes the frame image by the predetermined encoding method by use of the resolution and the frame rate which have been notified from controller 46, and outputs the encoded frame image to transmitter 8. Transmitter 8 then transmits the frame image encoded in encoder 7 to the reception device through the network (step S75a).

On the other hand, when the second frame rate is higher than the frame rate of the reception device ("No" in step S73), controller 46 determines that the resolution of the frame image to be transmitted from transmission device 400 to the reception device is the resolution with which encoding is possible at the second frame rate in encoder 7. Further, controller 46 determines that the frame rate of the frame image to be transmitted from transmission device 400 to the reception device is the frame rate of the reception device. Controller 46 then notifies encoder 7 of the determined resolution and frame rate (step S75).

Encoder 7 encodes the frame image by the predetermined encoding method by use of the resolution and the frame rate which have been notified from controller 46, and outputs the encoded frame image to transmitter 8. Transmitter 8 then transmits the frame image encoded in encoder 7 to the reception device through the network (step S75a).

As described above, the second frame rate of 24 fps is smaller than the frame rate (30 fps) of the reception device ("Yes" in step S73). Therefore, controller 46 determines that the resolution of the frame image to be transmitted from transmission device 400 to the reception device is 320×240 being the resolution with which encoding is possible at the second frame rate of 24 fps in encoder 7. Further, controller 46 determines that the frame rate of the frame image to be transmitted from transmission device 400 to the reception device is the second frame rate (24 fps). Controller 46 then notifies encoder 7 of the determined resolution and frame rate.

Encoder 7 encodes the frame image by the predetermined encoding method by use of the resolution and the frame rate which have been notified from controller 46, and outputs the encoded frame image to transmitter 8. Transmitter 8 then transmits the frame image encoded in encoder 7 to the reception device through the network (step S75a).

As described above, according to transmission device 400 and the transmission method of the present embodiment, in transmission device 400 and the transmission method for encoding a plurality of captured frame images and transmitting the plurality of encoded frame images to the reception device through the network, a resolution and a frame rate of the captured frame image are adaptively controlled based on a size of a motion of the captured frame image, viewing conditions of the reception device, a congestion degree of the network, and a load state of the encoder. As a result, the motion of the subject captured in transmission device 400 can be reproduced in the reception device by use of the maximum possible resolution.

Note that, in the first and second embodiments, the following method can be adoptable at the time of controlling a data volume of temporally successive frame images generated in image capturing part 1 in accordance with the frame rate.

FIGS. 8A, 8B, and 8C are schematic diagrams each showing a state where a part of the plurality of temporally successive frame images generated in image capturing part 1 is selected at the time of controlling a data volume of the plurality of temporally successive frame images in accordance with the frame rate of the frame image (the first frame rate, the second frame rate, or the frame rate of the frame image received from the reception device).

FIG. 8A is a schematic diagram showing a state where three frame images (frame image 1, frame image 11, frame image 21) are selected at regular intervals from frame images of 30 frames. FIG. 8B is a schematic diagram showing a state where the three clearest frame images (frame image 1, frame image 9, frame image 29) of the subject are selected from the frame images of 30 frames. FIG. 8C is a schematic diagram showing a state where one frame image (frame image 1, frame image 14, frame image 29) with the clearest subject is selected every ten frames.

Analyzer 3 analyzes clarity of the subject by use of a plurality of frame images stored in storage part 2. Analyzer 3 then outputs the clarity of the subject to controller 6 and controller 46. A method for analyzing the clarity of the subject is, for example, analyzing the clarity from a difference in template matching between a plurality of frame images and data bases previously stored in transmission device 100 and transmission device 400 which is performed at the time of specifying the subject from the plurality of frame images. That is, as the difference in template matching is smaller, the subject is considered to be clearer. Note that the method for analyzing the clarity of the subject is not limited to the above method, and various other methods are applicable.

Based on the clarity outputted from analyzer 3 in addition to the resolution used at the time of encoding by controlling a data volume of the plurality of temporally successive frame images generated in image capturing part 1, controller 6, 46 includes, in the predetermined parameters, information for selecting a frame image from the temporally successive frame images in accordance with the frame rate (the first frame rate, the second frame rate, or the frame rate of the reception device) used at the time of encoding by controlling a data volume of the plurality of temporally successive frame images generated in image capturing part 1. Controller 6, 46 then notifies encoder 7 of the predetermined parameters.

Based on the predetermined parameters, encoder 7 encodes the frame image by the predetermined encoding method by use of the resolution notified from controller 6, 46 and the selected and notified frame image, and outputs the encoded frame image to transmitter 8. Transmitter 8 transmits the frame image encoded in encoder 7 to the reception device through the network.

As shown in FIG. 8C, for example, one frame image (e.g., frame image 1, frame image 14, frame image 29) with the clearest frame image of the subject may be selected as a specific frame image from 10 frame images, where 10 is a predetermined successive number.

According to the transmission device and the transmission method of the present embodiment, in the transmission device and the transmission method for encoding a plurality of captured frame images and transmitting the plurality of encoded frame images to the reception device through the network, a part of the frame images is selected in accordance with clarity of the frame images at the time of encoding by controlling a data volume of the plurality of temporally successive frame images generated in the image capturing part in accordance with a frame rate in addition to a size of a motion of the plurality of captured frame image, viewing conditions of the reception device, and a congestion degree of the network. Therefore, the motion of the subject captured in the transmission device can be reproduced with a clearer frame image in the reception device by use of the maximum possible resolution.

In the present embodiment, although the description has been given based on transmission device 400 shown in FIG. 5, image capturing part 1a may be installed outside a housing of transmission device 400 as in the configuration of transmission device 100a shown in FIG. 4. Image capturing part 1a may be used by being electrically connected with transmission device 400 by electric wiring through connector 1b.

INDUSTRIAL APPLICABILITY

According to the present disclosure, since a data volume of a captured frame image is adaptively controlled based on a size of a motion of the captured frame image, viewing conditions of a reception device, and a congestion degree of a network, a motion of the subject captured in a transmission device can be reproduced in the reception device by use of the maximum possible resolution. The present disclosure is effective as a transmission technique for encoding a captured frame image and transmitting the encoded frame image to the reception device through the network.

REFERENCE MARKS IN THE DRAWINGS 1, 1a image capturing part
1b connector
2 storage part
3 analyzer
4 viewing condition receiver
5 network bandwidth measurement part
6, 46 controller
7 encoder
8 transmitter
42 decoder
100, 100a, 400 transmission device

The invention claimed is:

1. A transmission device which transmits a plurality of encoded frame images to a reception device connected through a network, the transmission device comprising:
   an image capturing part that captures a subject and generates a plurality of temporally successive frame images;
   an analyzer that analyzes a size of a motion of the subject by use of at least two or more of the frame images generated in the image capturing part;
   a viewing condition receiver that receives viewing conditions from the reception device;
   a network bandwidth measurement part that measures a congestion degree of the network;
   a controller that controls a data volume of the plurality of frame images generated in the image capturing part based on the size of the motion of the subject, the viewing conditions, and the congestion degree of the network, to determine a predetermined parameter for encoding;
   an encoder that encodes the plurality of frame images based on the predetermined parameter; and
   a transmitter that transmits the plurality of encoded frame images.

2. The transmission device according to claim 1, wherein
the viewing condition receiver receives, from the reception device, viewing conditions including a resolution and a frame rate of a frame image, and
the controller
calculates a frame rate, which allows transmission with the resolution of the frame image received from the reception device, as a first frame rate based on the congestion degree of the network,
calculates a frame rate of the frame image generated in the image capturing part as a second frame rate based on the size of the motion of the subject, and
compares the first frame rate with the second frame rate, wherein
   when the first frame rate is lower than the second frame rate, the controller determines the second frame rate and a resolution with which transmission is possible at the second frame rate as the predetermined parameter, and
   when the first frame rate is equal to or higher than the second frame rate, the controller determines the first frame rate and the resolution of the frame image generated in the image capturing part as the predetermined parameter.

3. The transmission device according to claim 1, wherein
the viewing condition receiver receives, from the reception device, viewing conditions including a resolution and a frame rate of a frame image, and
the controller
compares a resolution of the frame image generated in the image capturing part with the resolution of the frame image received from the reception device, wherein
   when the resolution of the frame image received from the reception device is higher than the resolution of the frame image generated in the image capturing part, the controller calculates the frame rate, at which transmission is possible with the resolution of the frame image generated in the image capturing part, as a first frame rate based on the congestion degree of the network, and when the resolution received from the reception device is equal to or lower than the resolution of the frame image generated in the image capturing part, the controller calculates the frame rate, at which transmission is possible with the resolution of the frame image received from the reception device, as the first frame rate based on the congestion degree of the network, calculates as a second frame rate the frame rate of the frame image generated in the image capturing part based on the size of the motion of the subject, and compares the first frame rate with the second frame rate, wherein when the first frame rate is lower than the second frame rate, the controller determines the second frame rate and a resolution with which transmission is possible at the second frame rate as the predetermined parameter, and when the first frame rate is equal to or higher than the second frame rate, the controller determines the first frame rate and the resolution of the frame image generated in the image capturing part as the predetermined parameter.

4. The transmission device according to claim 2, wherein the controller measures a load state of the encoder, and calculates a frame rate, which encoding allows with the resolution of the frame image received from the reception device, as a third frame rate based on the load state, wherein when the first frame rate is higher than the third frame rate, the controller determines the first frame rate and the resolution with which encoding is possible at the first frame rate calculated based on the load state as the predetermined parameter, and when the first frame rate is equal to or lower than the third frame rate, the controller determines the first frame rate and the resolution of the frame image received from the reception device as the predetermined parameter.

5. The transmission device according to claim 2, wherein the analyzer analyzes clarity of the subject by use of the frame image generated in the image capturing part, and the controller includes, in the parameters, information for selecting a specific frame image from the plurality of frame images generated in the image capturing part, based on the clarity in accordance with a frame rate that is used in controlling a data volume of the frame image from the frame image generated in the image capturing part.

6. The transmission device according to claim 5, wherein the specific frame image is one clearest frame image of a predetermined number of successive frame images.

7. A transmission device which transmits an encoded frame image to a reception device connected through a network, the transmission device comprising:

a connector that connects an image capturing part for capturing a subject and generating a plurality of temporally successive frame images;

an analyzer that analyzes a size of a motion of the subject by use of at least two or more of the frame images generated in the image capturing part;

a viewing condition receiver that receives viewing conditions from the reception device;

a network bandwidth measurement part that measures a congestion degree of the network;

a controller that controls a data volume of the plurality of frame images generated in the image capturing part based on the size of the motion of the subject, the viewing conditions, and the congestion degree of the network, to determine predetermined parameters for encoding;

an encoder that encodes the plurality of frame images based on the predetermined parameters; and a transmitter that transmits the plurality of encoded frame images.

8. The transmission device according to claim 7, further comprising a decoder, wherein the decoder generates a decoded signal from the plurality of temporally successive encoded frame images generated in the image capturing part, and inputs and stores the decoded signal into a storage part.

9. A transmission method performed in a transmission device which transmits an encoded frame image to a reception device connected through a network, the method comprising:

capturing a subject and generating a plurality of temporally successive frame images;

analyzing a size of a motion of the subject by use of at least two or more of the generated frame images;

receiving viewing conditions from the reception device;

measuring a congestion degree of the network;

controlling a data volume of the plurality of generated frame images based on the size of the motion of the subject, the viewing conditions, and the congestion degree of the network, to a determine predetermined parameter for encoding;

encoding the plurality of frame images based on the predetermined parameter; and transmitting the plurality of encoded frame images.

* * * * *